May 18, 1965
W. M. WILSON
3,183,966
CONTROL SYSTEM
Filed July 31, 1961
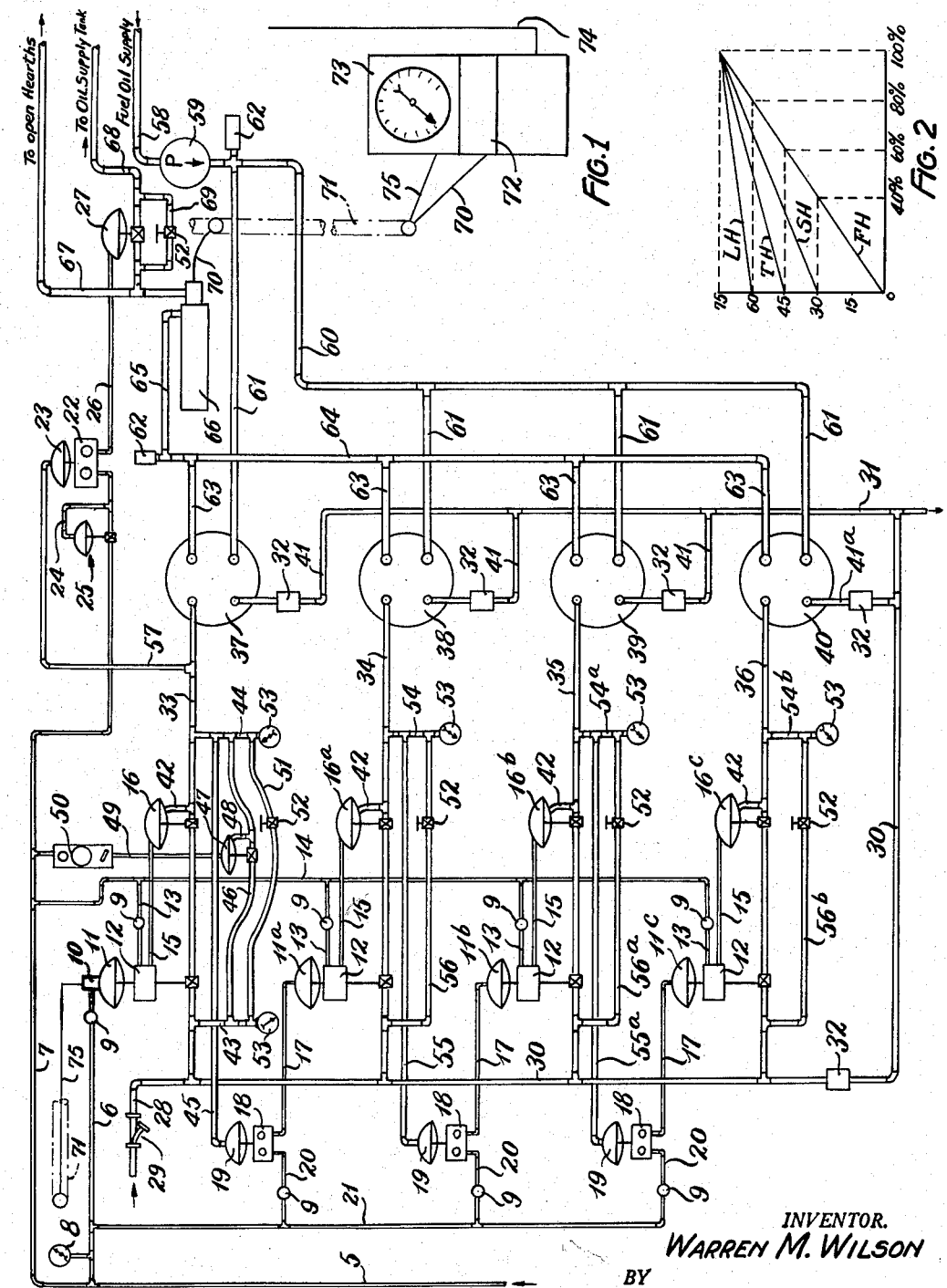
INVENTOR.
WARREN M. WILSON
BY
Williams, David, Hoffmann & Yourt
ATTORNEYS

3,183,966
CONTROL SYSTEM
Warren M. Wilson, Huron, Ohio, assignor to W. M. Wilson Co., Inc., Strongsville, Ohio, a corporation of Ohio
Filed July 31, 1961, Ser. No. 128,189
12 Claims. (Cl. 165—32)

This invention relates to a control system and more particularly to a viscosity control system, although it is also susceptible of functioning as a temperature control system.

The control system embodying the invention is for use in industrial plants to control the viscosity or temperature of fluids used in substantial volume in connection with the operation of apparatus or in the carrying out of processes or both.

As an illustrative example of the advantageous use of the control system the same will be described herein as employed in a steel mill to control the viscosity of the fuel oil supplied to the open hearth furnaces of the mill.

It will be understood that the system as described herein can function to control the temperature of the liquid to obtain the same end result and it will be pointed out that this can be done by using a temperature sensing device rather than a viscosity sensing device.

It will also be understood that the system can be adapted to other environments where it is desirable to control the viscosity or temperature of a substantial volume of flowing fluid.

The invention contemplates an improved, efficient and automatic control system of the type above referred to and one wherein the system, in response to the volume of fluid flow controlled by it, functions with smooth variations both upwardly and downwardly of its operative range and without "bumps" as its control capacity requirements change.

The invention further contemplates a control system of the type referred to wherein the variations in the viscosity or temperature of the controlled fluid flow will be sensed and transmitted to suitable instruments which interpret the sensing signals and automatically vary the function of the system upwardly or downwardly of its operative range and which instruments can be located remotely to and at a substantial distance from the major part of the system as, for instance, in a steel mill in a control room remote with respect to the remainder of the system.

More specifically the control system contemplated by the invention provides for breaking down the total heat transfer area for maximum fluid flow requirements into a plurality of sub-heat transfer areas and the control of which is so integrated as to provide a variable heat transfer area system.

In carrying this conception forward it is proposed to employ a plurality of heat exchangers which seriatim are automatically increasingly brought into operation or decreasingly taken out of operation in response to variations in the load requirements.

Each of the heat exchangers individually is a constant area heat exchanger, as distinguished from a variable area heat exchanger such as is disclosed in Patent No. 3,047,-274, issued July 31, 1962, but the heat exchangers of the present invention have a combined functionability such that they constitute a variable area heat transfer system as the individual exchangers are functionally brought into or taken out of the system.

The invention contemplates, in one instance, utilizing steam as the temperature controlling medium in the series of heat exchangers and integrating into the system automatically controls for the flow of steam to the heat exchangers and employing the condensing steam pressure in a preceding heat exchanger of the series to smoothly increase or decrease steam flow pressure to a succeeding heat exchanger in the series and in phased variation.

The same results can be achieved by having all controls take their impulse from a common source which may be that illustrated and described by way of example in this application, namely, the condensing steam pressure in the first heat exchanger of the series of heat exchangers. On the other hand, the system might employ an arrangement wherein the control for the second heat exchanger takes its impulse from the condensing steam pressure in the first heat exchanger; the control for the third heat exchanger takes its impulse from the condensing steam pressure in the second heat exchanger; the control for the fourth heat exchanger takes its impulse from the condensing steam pressure in the third heat exchanger, and so on throughout the series of heat exchangers.

The invention further and more specifically contemplates a control system which can be readily varied in its functioning sequentially to suit different desired conditions as will become apparent in the detailed description of an example of the system hereinafter set forth.

A specific arrangement of the system for controlling the flow of fuel oil to an apparatus contemplates using the viscosity of the oil to regulate the flow thereof and one wherein there are no automatic control valves for the flow of fuel oil to or from the various ones of the series of heat exchangers in the system. In this aspect of the invention when the flow load requirement is small then only the first heat exchanger of the system is activated by the flow of the steam thereto and substantially all of the oil flow will be through the said first heat exchanger, even though no control valves are required to control the flow of oil to the other heat exchangers in the series as the hydraulic flow of the oil will seek the line of least resistance and in said other and unheated heat exchangers of the series the greater viscosity of the oil reaching the same automatically creates the necessary resistance to flow of the oil through such other heat exchangers.

The system embodying the invention contemplates the use of an oil blender through which the oil from the functioning heat exchanger or exchangers and the oil which may "weep" through the current non-functioning heat exchanger or exchangers flows and becomes intermixed and the viscosity of this intermixed oil in the blender is sensed to control the system, provided the control function of the system is viscosity, but of course if it is temperature then the intermixed oil in the blender would have its temperature sensed.

In order to more clearly bring out the novel and useful features of the system and to make apparent its advantages, the system as adapted for a particular environment and use will now be described in conjunction with the accompanying drawing forming a part of this description and wherein FIG. 1 is a schematic illustration of the system, and
FIG. 2 is a load graph depicting the load conditions and percentages which function to automatically and successively bring in or take out the heat exchangers of the series of heat exchangers upon the existence of predetermined conditions to effect the smooth control function of the system in response to increases or decreases in load requirements.

As previously stated, the control system embodying the invention will be described as one suitable for controlling the flow of fuel oil to one or more open hearth furnaces in a steel mill by sensing the viscosity of the flowing fuel oil as it leaves the control system to flow to the open hearth furnaces.

The control system utilizes the plant compressed air source and the plant steam source. The conduit from the plant compressed air source is indicated at 5 and this air conduit 5 is connected to branch air conduits 6 and 7. The branch air conduit 6 carries an indicating pressure gauge 8 and an air filter 9. The branch air conduit 6 extends to an electropneumatic positioner 10 of commercially known type as, for example, an E/P positioner manufactured and sold by Moore Products Company of Philadelphia, Pennsylvania.

As is well known, this positioner is a force-balance unit and as will later be pointed out receives an electric signal from a control instrument with a D.C. output and operates conventional and springless pneumatic actuators which may be of the cylinder or diaphragm type. The electropneumatic positioner 10 is mounted on the "lead" diaphragm control valve 11 which, as will later be pointed out, controls the supplying of steam to the first heat exchanger in the series of heat exchangers in the control system and said positioner 10 strokes said "lead" diaphragm control valve.

Also mounted on the "lead" diaphragm control valve 11 is a position transmitter 12 of commercial type and which, in response to variations in the position of the actuating stem of the diaphragm control valve 11, sends out a variable air signal which, for example, may have the range of zero to 20 p.s.i.g. (presure square inch gauge)

The position transmitter 12 may be of any commercial type, as, for instance, it may be the pneumatic transmitter and positioning relay manufactured and sold by The Bailey Meter Company of Cleveland, Ohio. The position transmitter 12 has its inlet connected to an air conduit 13 which, in turn, is connected to an air conduit 14 that extends from the branch air conduit 7. The outlet side of the position transmitter 12 is connected by an air conduit 15 to a diaphragm control valve 16 of known type commercially available and which is constructed to be air loaded on one side of the diaphragm while the opposite side thereof is subjected to steam pressure as will later be pointed out. The valve 16 may be a Leslie G.P.K. valve manufactured by Leslie Company, Lyndhurst, New Jersey The embodiment of the control system illustrated includes four heat exchangers, although it will be understood that the system may include a greater or lesser number of heat exchangers depending upon its functional requirements. However, on the basis of a system employing four heat exchangers, it will be noted that in addition to the lead diaphragm control valve 11 there are three diaphragm control valves 11a, 11b, and 11c, but only the lead diaphragm control valve 11 is provided with the electropneumatic positioner 10. However, each of the diaphragm control valves 11a, 11b and 11c is provided with a position transmitter 12 responsive to the movement of the valve stem of said diaphragm control valves and having its inlet side connected by an air conduit 13 to the air conduit 14, as in the case of the position transmitter 12 of the "lead" diaphragm control valve 11. All four of the air conduits 13 may be provided with air filters 9. The outlet sides of the position transmitters 12 associated with the diaphragm control valves 11a, 11b and 11c are connected, respectively, by air conduits 15 to diaphragm control valves 16a, 16b and 16c, corresponding to diaphragm control valve 16 previously described.

The diaphragm control valves 11a, 11b and 11c are connected by air conduits 17 to pressure pilots and specifically to proportional band adjustment devices 18 that are operatively associated with Bourdon spring pressure pilots 19, which are steam loaded, as will later be described. The proportional band adjustment devices 18 are responsive to the variable positions of an actuated part of the pressure pilots 19. The proportional band adjustment devices 18 and the pressure pilots 19 associated therewith are of known construction, one example of which is the "Wizard" pressure pilot made and sold by Fisher Governor Company of Marshalltown, Iowa and employing a Bourdon tube and having a one-hundred percent proportional band adjustment with a range from zero to 100 p.s.i.

The proportional band adjustment devices 18 are connected by air conduits 20 to an air conduit 21 which, in turn, is connected to branch air conduit 6. The air conduits 20 may be provided with air filters 9. The branch air conduit 7 extends to a proportional band adjustment device 22, similar to the devices 18, but having a lesser operative range, namely, 2 to 20 p.s.i.

The device 22 is operatively associated with a pressure pilot 23, similar to the pressure pilots 19 and connected into the steam circuit as will later be pointed out. The branch air conduit 7 is connected by feed-back air conduit 24 to the diaphragm control portion of an air reducing unit 25 of a construction well known in the art.

The proportional band adjusting device 22 associated with the pressure pilot 23 is connected by an air conduit 26 to the diaphragm control portion 27 of a fuel oil control valve later to be referred to.

The air circuitry and the control devices therein having been described, the steam circuitry and its integration with the air circuitry will now be described. The connection to the plant steam supply is indicated at 28 and may include a strainer 29. The connection 28 includes a steam conduit 30 that extends to a steam condensate drain conduit 31. The conduit 30 is provided with a steam trap 32. The steam conduit 30 is connected to branch steam conduits 33, 34, 35 and 36 which, in turn, respectively extend to and are connected with the steam inlet of heat exchangers 37, 38, 39 and 40. The steam outlet of the heat exchangers 37, 38 and 39 is connected by steam outlet conduits 41 with the steam condensate drain conduit 31. The steam outlet of the heat exchanger 40 is connected by steam outlet conduit 41a to the steam conduit 30 which, as has been stated, is also connected to the steam condensate drain conduit 31. The steam outlet conduits 41 and 41a are provided with steam traps 32. The heat exchangers 37, 38, 39 and 40 are of the constant area type and may be various known commercial forms of this type of heat exchanger, but for illustrative purposes may be considered as the heat exchanger having helical coil elements for the heating liquid and the liquid to be heated arranged in a containing shell and produced by Graham Manufacturing Company, Inc. of New York, New York, and sold under the trade name "Heliflow."

It will be understood that the steam flows through one of the coils of the heat exchangers while the fuel oil will flow through the other coil thereof as will later be explained.

The valve proper that is actuated by the valve stem of the diaphragm control valve 11 controls the flow of steam through the branch conduit 33 that extends to the heat exchanger 37 which will be referred to as the "first" heat exchanger.

The steam branch conduit 33 is connected by a feed-back conduit 42 to the diaphragm control valve 16 so that steam supplied to the valve 16 operates in opposition to the air load on the diaphragm thereof and which air load is supplied from the position transmitter 12. The valve proper of the diaphragm control valve 16 is in the conduit 33 ahead of the feed-back conduit 42 and is opened or closed in response to the movement of the diaphragm valve. The valve 16 senses the steam pressure to the "first" heat exchanger 37 for a purpose later to be explained.

Similarly the valve proper of the diaphragm control valves 11a, 11b and 11c are in the steam conduits 34, 35 and 36, respectively, that extend to the second, third and fourth or last heat exchangers 38, 39 and 40. Also similarly the diaphragm control valves 16a, 16b and 16c are connected to the conduits 34, 35 and 36 by feed back conduits 42 for the same purpose as the feed back conduit 42 to the control valve 16.

The branch steam conduit 33 has connected thereto manifold branch conduits 43 and 44, with the conduit 43 being located intermediate the steam conduit 30 and the valve proper of the "lead" diaphragm valve 11, while the conduit 44 is located intermediate the feed-back conduit 42 and the "first" heat exchanger 37.

The manifold branch conduit 44 is connected to the first diaphragm controlled pressure pilot device 19 by a conduit 45, so as to supply steam pressure to the diaphragm of said device. The manifold conduits 43 and 44 are interconnected by a conduit 46 and a steam loaded diaphragm controlled and actuated bypass valve 47 is located in this conduit 46. The feed-back connection 48 between the conduit 46 and one side of the diaphragm of the valve 47 supplies the steam load to the valve while the other side of the diaphragm receives air pressure from an air conduit 49 that is connected to the branch air conduit 7 and contains therein a manual air loading device 50 which can be utilized, in the event of a failure of the source of electricity, to operate the system manually. The valve 47 may be a Leslie class G.P.K. valve previously referred to and similar to the valves 16, 16a, 16b and 16c.

The manifold branch conduits 43 and 44 are also connected by a conduit 51 having therein a manually actuated valve 52 which is normally closed and is provided for use in case it becomes necessary to bypass the steam flow around the valves 11, 16 and 47. The manifold conduits 43 and 44 may have pressure gauges 53 connected thereto.

The steam branch conduit 34 intermediate the feedback 42 to the valve 16a and the heat exchanger 38 has connected thereto a manifold conduit 54. This manifold conduit 54 is connected by a conduit 55 to the second diaphragm controlled pressure pilot device 19. A conduit 56 extends from the manifold conduit 54 and is connected to the conduit 34 intermediate the conduit 30 and the valve proper of the diaphragm control valve 11a and contains therein a manually actuated valve 52. The manifold conduit 54 may be provided with a pressure gauge 53. Similarly the conduit 35 is provided with a manifold conduit 54a that is interconnected by a conduit 55a to the third diaphragm control pressure pilot device 19. Likewise, a conduit 56a interconnects the manifold conduit 54a with the conduit 35 intermediate the conduit 30 and the valve proper of the control valve 11b.

The conduit 36 is connected with a conduit 54b similarly located as are the manifold conduits 54 and 54a. The conduit 54b is connected by a conduit 56b to the conduit 36 intermediate the conduit 30 and the valve proper of the diaphragm control valve 11c.

The steam branch conduit 33 intermediate its connection to manifold conduit 44 and the "first" heat exchanger 37 is interconnected with a conduit 57 that is connected to the pressure pilot 23.

The circuitry in the system for the fluid the viscosity or temperature of which is to be controlled, in this instance fuel oil for the open hearth furnaces of a steel mill, will now be described. An oil flow line 58 extends from an oil supply source, not shown, to the input side of a pump 59. The output side of the pump 59 is connected to an oil flow line 60 which in turn is connected to branch oil flow lines 61 that are connected to the inlet end of the coils for the fluid (the fuel oil) to be heated of the heat exchangers 37, 38, 39 and 40. A thermometer 62 may be connected to the oil flow line 60 where the branch oil flow line 61 to the "first" heat exchanger 37 is connected.

The outlet end of the coils in the heat exchangers 37, 38, 39 and 40 for the fluid to be heated is connected by oil flow lines 63 to a return flow line 64 for the heated oil. The return oil flow line 64 also has a thermometer 62 connected thereto and adjacent to the thermometer 62 the line 64 is connected to an oil flow line 65 that extends to an oil blender 66. The blender 66 is to intermix thoroughly the heated oil flowing from the heat exchangers, or if some of the heat exchangers are not on the steam stream, to intermix the oil flowing from those heat exchangers which are heated with the oil "weeping" through the non-heated heat exchangers.

The blender 66 may be of well known construction and consists of an outer cylindrical jacket into which the oil from the heat exchangers flows, and an inner cylinder of smaller diameter than the outer cylinder and into which the oil flows from the outer cylinder. The inner cylinder of the blender 66 has an outlet connected to an oil flow line 67 that extends to the open hearth furnaces of the steel mill.

In order to provide for automatic recirculation of the oil when the "first" heat exchanger is subjected to a minimum steam condensing pressure as, for instance, 2 p.s.i. if this minimum is selected, the following ararngement is provided. The oil flow line 67 is connected to a recirculating oil flow line 68 that extends to the oil supply source. The valve proper of the diaphragm control valve 27 is in the flow line 68 and is normally closed when the steam condensing pressure to the "first" heat exchanger is at or above the selected minimum. When the steam condensing pressure to the "first" heat exchanger is below the selected minimum the diaphragm control valve 27 is opened, which results in a through flow of oil through the "first" heat exchanger and this induces a load that requires the minimum steam condensing pressure to the "first" heat exchanger, and the control valve 27 remains open until the steam condensing pressure to the "first" heat exchanger is at or in excess of the minimum, whereupon said valve will automatically close. The flow line 69 is connected into the line 68 and bypasses the valve of the control valve 27. This flow line 69 is provided with a manual valve 52 that is normally closed but can be opened to bypass the control valve 27 should occasion make it desirable to do so.

The viscosity sensing probe is inserted into the inner cylinder of the blender 66 and secured in such position. This probe is commercially available and may take the form of the Bendix Ultra-Viscoson manufactured and sold by The Bendix Aviation Corporation, Cincinnati, Ohio Division.

The viscosity sensing probe is connected to an electrical lead 70 that extends through a pipe conduit 71 to a suitable electronic computer 72 which may be a component of the Bendix Ultra-Viscoson, having as another component thereof the viscosity sensing probe previously referred to.

The signal received by the computer 72 from the viscosity sensing probe is transferred to a control instrument 73 which is commercially available and may take the form of the "Brown ElectroniK" magnetic amplifier manufactured and sold by the Minneapolis-Honeywell Regulator Company, Industrial Division, Philadelphia, Pa. The computer 72 is connected by lead 74 to a 10 v., 60 cycle electrical source.

The heat exchangers and the control valves of the system may be located at a substantial distance from the computer 72 and control instrument 73 as, for instance, the heat exchangers and control valves and the oil, air and steam piping may be located in the pump house of the mill, while the computer 72 and control instrument 73 may be located in the open hearth instrument shop of the mill.

The control instrument 73 sends out through electrical lead 75 that extends through the pipe conduit 71 and is connected to the E/P positioner 10 associated with the "lead" diaphragm control valve 11 an electrical signal correlated to the viscosity of the oil in the inner cylinder of the blender 66 and which is sensed by the viscosity probe.

It will be understood that manual valves 52 can be located in the steam conduits and the oil flow lines whereever it is desirable to do so, so that certain portions of the system can be isolated when necessary for repairs or other purposes.

Assuming that the open hearth furnaces of the mill are being set in operation and that the control instrument 73 has been preset for a desired viscosity rating for the fuel oil, and also assuming that the pump 59 is in operation and air pressure is in the inlet air conduit 5 and steam is in the connection 28 to the steam supply source, the system operates as follows: The viscosity probe in the blender 66 senses the viscosity of the fuel oil flowing to the furnaces and sends a signal through lead 70 to the computer 72 which, in turn, sends an MV signal to the control instrument 73. Assuming that the sensed viscosity is higher than the setting on the instrument 73 said instrument will increase through the lead 75 a milliamp signal to the E/P positioner 10 and this will cause an increase from the branch air conduit 6 in the air pressure load on the diaphragm of the "lead" control valve 11 resulting in an increased opening of the valve proper of said control valve that is in the steam branch conduit to the "first" heat exchanger 37. The movement of the valve stem of the control valve 11 causes the position transmitter 12 to send a loading air pressure signal to the diaphragm control valve 16.

The position transmitter 12 preferably should have a range of zero to 100 p.s.i. of air pressure. The diaphragm control valve 16 is the basic control valve which senses steam pressure to the "first" heat exchanger 37, it being recalled that said valve is subjected to the steam pressure through the feedback conduit 42 extending from the conduit 33.

The pressure pilot 23 is also connected through the steam conduit 57 to the branch conduit 33 and said pressure pilot would have been adjusted for minimum steam pressure above which throttling control will take place. If the steam pressure drops below the minimum steam pressure referred to, because little oil is being consumed in the open hearth furnaces, pressure pilot 23 will cause the valve proper of the control valve 27 to open and permit enough recirculation of the oil through the conduit 68 up to a predetermined maximum to insure stable control.

Each of the four heat exchangers will have a predetermined capacity of heating a desired number of gallons per minute of fuel oil when a predetermined p.s.i.g. of steam is on the steam inlet to the exchanger, but a greater p.s.i.g. of steam is required in the steam conduits 33, 34, 35 and 36 where controlled by the valves 11, 11a, 11b and 11c.

When the "first" heat exchanger 37 is subjected to a predetermined value of steam pressure the proportional band adjusting device 18 that is associated with the pressure pilot device connected to the steam conduit 45 is actuated and will start bringing the heat exchanger 38 into operation. The function of the proportional band adjusting device 18 in such that when the steam pressure to the "first" heat exchanger 37 is approaching a predetermined rating the heat exchanger 38 will come into operation with a smoothly increasing capacity due to the opening of the valve proper of the control valve 11a that is in the steam conduit 34.

It will be understood that the position transmitter 12 associated with said valve 11a functions by the transmission of an air signal to cause the valve proper of control valve 16a to open more and more. Similarly, the pressure pilot 19 connected to the steam conduit 55 receives a signal from the steam supplied to heat exchanger 38 and functions through the proportional band adjusting device 18 associated with it to actuate control valve 11b and control valve 16b to subject heat exchanger 39 to steam flow. In the same way the heat exchanger 40 is brought into operation by being subjected to steam flow through the pressure pilot 19 associated with the conduit 55a and the proportional band adjusting device 18 that is connected to control valve 11c.

It will thus be seen that as the demand for the fuel oil at the open hearth furnaces increases the heat exchangers 37, 38, 39 and 40 are successively brought into functional operation, and conversely, as the load decreases the heat exchangers 40, 39 38 and 37 are successively and gradually dropped from functional operation.

Although each heat exchanger is of the constant area type the successive bringing in to functional operation of the same or the dropping thereof out of functional operation, provides a variable area heat exchanger effect in the system which can handle a wide variation in the gallons per minute of fuel oil flowing to the open hearth furnaces. The heat exchangers are brought into or dropped out of functional operation with what might be designated as an anticipatory controlling action responsive to greater or lesser fuel oil flow demands occurring at the open hearth furnaces.

FIG. 2 is a load graph illustrating the smooth successive bringing in or dropping out of functional operation of the four heat exchangers specifically illustrated herein. The ordinate of the graph represents steam pressure in the heat exchangers in terms of pressure square inch gauge. The abscissa of the graph represents percentage of capacity of the heat exchangers. The line FH represents the first heat exchanger; the line SH the second heat exchanger; and the lines TH and LH represent, respectively, the third and fourth or last heat exchangers.

When the steam pressure in the "first" heat exchanger 37 is at 30 p.s.i.g., which occurs when said heat exchanger is operating at 40% of capacity, the second heat exchanger 38 is activated by steam flow therethrough, the pressure of which can be increased from zero to 75 p.s.i.g. while the steam on the "first" heat exchanger 37 is increasing from 30 to 75 p.s.i.g., at which time the first heat exchanger is functioning at 100% capacity. When the "first" heat exchanger 37 is subjected to steam pressure of 45 p.s.i.g., and is functioning at 60% of capacity the third heat exchanger 39 is activated and functions over a range from zero to 75 p.s.i.g. during the time the "first" heat exchanger is functioning over a range of 45 to 75 p.s.i.g. When the "first" heat exchanger 37 is subjected to a steam pressure of 60 p.s.i.g. and is operating at 80% of capacity the last or fourth heat exchanger 40 is activated and during the period that the "first" heat exchanger is subjected to increasing steam pressure over a range of 60 to 75 p.s.i.g. the fourth or last heat exchanger is subjected to steam pressure over a range of zero to 100 p.s.i.g.

It will be seen that the heat exchangers from the first to the fourth are successively brought into operation in correlation to the steam pressures to which the "first" heat exchanger is subjected and to variable percentages of capacity operation of the first heat exchanger until all four of the heat exchangers are operating at 100% capacity and under steam pressure of 75 p.s.i.g.

In this way, due to the overlapping functional operation of the heat exchangers, there is a smooth increase in the capacity of the system from minimum load requirements to maximum load requirements. Conversely, the heat exchangers are successively taken out of functional operation starting with the fourth or last heat exchanger 40 and proceeding toward the first heat exchanger 37 as load requirements decrease. In this way the system automatically provides for smooth increases or decreases in oil heating capacity to maintain the desired viscosity of the fuel oil flowing to the open hearth furnaces and in correlation to the load requirements for such flow.

As previously stated, the effect is a control system operative on the basis of a true variable area heat exchange system but with the individual heat exchangers used in the system being of the constant area type.

It will be understood that since viscosity is an inverse function of temperature, that is viscosity decreases as temperature increases, the system can readily be adapted to sense the temperature of the fuel oil rather than the viscosity thereof and indirectly controlling the viscosity of the fuel oil by correlation to reference temperatures. As previously mentioned, a temperature sensing device can then be used in the system. Such a sensing device can be in the form of a Model 3800 Temperature Controller sold by The Mason-Neilan Regulator Company. It should be apparent that any sensing device used would provide an output signal depending upon the viscosity of the fuel oil.

An important feature of the system is the use of the blender 66 which receives the fuel oil discharged from all four of the heat exchangers and intermixes such fuel oil so that the sensed viscosity is on the basis of that of the intermixed oils.

When certain of the heat exchangers do not have steam supplied to them, the oil in such heat exchangers being unheated is highly viscous and very little flow of oil through these heat exchangers will occur. However, a certain volume of the unheated oil may "weep" from these heat exchangers and reach the blender 66 so that the viscosity probe will sense the viscosity of the intermixed heated oil and unheated oil and if this viscosity is not the desired one the system will automatically correct the discrepancy.

In some instances the functional requirements of the system may be such as not to need the position transmitters 12 that are operatively associated with the diaphragm control valves 11, 11a, 11b and 11c or to require the diaphragm control valves 16, 16a, 16b and 16c which receive through the conduits 42 a feed-back of the condensing steam pressures in the heat exchangers 37, 38, 39 and 40.

When the system is employed in a complex installation, as for instance controlling the viscosity of fuel oil to a battery of open hearth furnaces in a steel mill, and one wherein the blender 66 and the velocity sensing probe therein are located usually a substantial distance from the heat exchangers, it is desirable to employ the position transmitters 12 and the diaphragm control valves 16, 16a, 16b and 16c. The reason for this is that should the consumption volume of the heated fuel oil be substantially and suddenly changed as, for instance, by cutting in or out of operation one or more of the open hearth furnaces, there would be a time lag before the viscosity of the blended fuel oil coming from the heat exchangers would be sensed by the viscosity probe in the blender 66, especially when such probe and blender as previously stated are located a substantial distance from the heat exchangers.

The provision of the position transmitters 12 and the diaphragm control valves 16, 16a, 16b and 16c which are responsive to the feed-back of the condensing steam pressures in the heat exchangers provide an "anticipatory" regulation of the steam flow to the heat exchangers so as to desirably regulate such flow prior to the sensing of the viscosity change in the blender 66 and through the signals sent out by the viscosity sensing probe effect a regulatory adjustment in the diaphragm control valves 11, 11a, 11b and 11c. The use of the diaphragm control valves 16, 16a, 16b and 16c reduces to a large extent sudden and substantial changes in the condensing steam pressure in the heat exchangers when sudden and substantial changes occur in the consumption volume of the heated fuel oil.

Although an illustrative example of a system embodying the invention has been shown and described herein, it will be understood that the system is susceptible of variations and modifications within the scope of the appended claims.

Having described my invention, I claim:

1. A control system of the character described comprising a series of heat exchangers, steam supply circuit means from a supply source to and through said heat exchangers, liquid circuit means for the liquid which is to be controlled and extending from a supply source to and through said heat exchangers to a use location, sensing means in said liquid circuit means intermediate the heat exchangers and said use location for sensing a condition of the flowing liquid and providing an output signal depending upon the viscosity thereof, said sensing means including a blender into which flows liquid from all of said heat exchangers and a viscosity sensing probe in said blender, control devices operatively associated with said steam supply circuit means controlling the steam to said heat exchangers, said control devices including a first set of diaphragm control valves controlling the flow of steam to said heat exchangers, air pressure supply circuit means communicating with said diaphragm control valves, an electropneumatic positioner operatively associated with at least the one diaphragm control valve for the first heat exchanger in the series of heat exchangers, control means operatively associated with said sensing means and including a computer receiving an electric signal from said sensing means, a control instrument receiving an electric signal from said computer and an electrical circuit from said control instrument to said electropneumatic positioner to impart an electric signal to said positioner to adjust the functional amplitude of said one diaphragm control valve, the other diaphragm control valves of said first set of diaphragm control valves which control the steam flow to the heat exchangers other than the first heat exchanger of the series being operatively associated with said air pressure supply circuit means through pressure pilots and proportional band adjusting devices, said pressure pilots being operatively connected to the steam supply circuit means at a location therein that is intermediate a heat exchanger of the series and the diaphragm control valve which controls the steam flow to said last mentioned heat exchanger.

2. A control system as defined in claim 1 wherein the pressure pilot and proportional band adjusting device that is operatively associated with the diaphragm control valve for a particular heat exchanger is connected to the steam circuit supply means intermediate the immediately preceding heat exchanger and the diaphragm control valve therefor.

3. A control system as defined in claim 1 wherein there is provided a second set of diaphragm control valves corresponding in number to said heat exchangers, each valve of the second set is located in the steam supply circuit intermediate a diaphragm control valve of the first set and the heat exchanger controlled thereby, each diaphragm control valve of the second set being connected to the steam supply circuit means by a feed-back connection thereto at a point intermediate the heat exchanger and the diaphragm control valve of the first set which controls the flow of steam to the latter.

4. A control system as defined in claim 3 wherein each of the diaphragm control valves of the first set has operatively associated with it a position transmitter, the intake to which is connected to said air pressure supply circuit means and the outlet from which is connected to the diaphragm control valve of the second set that has a feed-back connection to the steam supply circuit means to the heat exchanger controlled by the said diaphragm control valve of the first set.

5. A control system as defined in claim 1 wherein there is a manual settable air loading device having its inlet connected into said air pressure supply circuit means and its outlet connected to a diaphragm valve operatively associated with the steam supply circuit means to the first heat exchanger of the series while a feed-back steam conduit connects said last named diaphragm control valve with said steam supply circuit means, whereby in the event of failure of the electric circuit the system can be operated from said air pressure supply circuit means.

6. A control system as defined in claim 1 wherein said liquid circuit means intermediate said sensing means and said use location is provided with a recirculating branch to the supply source of the liquid, a diaphragm control valve is operatively associated with said recirculating branch, a pressure pilot is operatively connected to the steam supply circuit means to the first heat exchanger of the series, and a proportional band adjusting device has its inlet connected to said air pressure supply circuit means and its outlet connected to said last named diaphragm control valve that is operatively associated with said recirculating branch, whereby when the consumption of the liquid at the use location falls below a predetermined volume said diaphragm control valve in said recirculating branch automatically opens so a portion of the liquid will be recirculated to and from the supply source therefor.

7. A control system of the character described comprising first and second heat exchangers in parallel and effective to heat a first fluid flowing therethrough by a second fluid flowing therethrough, first flow circuit means for said first fluid from a supply source to said first and second heat exchangers in parallel and from said first and second heat exchangers to a use location, second flow circuit means for said second fluid extending from a supply source to said first heat exchanger, third flow circuit means for said second fluid extending from a supply source to said second heat exchangers, first valve means operatively associated with said second flow circuit means for controlling the flow of said second fluid to said first heat exchanger, first control means operatively associated with said first valve means to actuate said first valve means to effect an increase or a decrease in the flow of said second fluid to said first heat exchanger, sensing means operatively associated with said control means and located in said first fluid circuit means intermediate said first and second heat exchangers and said use location for sensing a condition of said first fluid and providing an output signal to said control means depending upon the viscosity of said first fluid, second valve means operatively associated with said third circuit means for controlling the flow of said second fluid to said second heat exchanger, and second control means responsive to the pressure in said first circuit means for said first heat exchanger for actuating said second valve means to vary the flow of said second fluid to said second heat exchanger.

8. A control system as defined in claim 7 wherein said first fluid is an oil-like liquid having relatively high viscosity at low temperatures and said second fluid is steam and wherein the outputs of said first and second heat exchangers are connected to a blender into which the first fluid from said first and second heat exchangers flows and said sensing means comprises a viscosity sensing probe in said blender for sensing the viscosity of the blended liquid from the first and second heat exchangers.

9. A control system as defined in claim 7 wherein said first and second control means each includes a diaphragm control valve for controlling the pressure of an external fluid to their associated valve means to effect actuation thereof.

10. A control system of the character described comprising heat exchanger means effective to heat a first fluid flowing therethrough by a second fluid flowing therethrough, first fluid circuit means for said first fluid extending from a supply source to said heat exchanger means and from said heat exchanger means to a use location, second fluid circuit means for said second fluid extending from a supply source to said heat exchanger means, a diaphragm valve in said second fluid circuit means for controlling the pressure of said second fluid in said heat exchanger and having a diaphragm member one side of which is loaded by the pressure of said second fluid in said heat exchanger and the other side of which is loaded by the pressure of a fluid other than said second fluid, a diaphragm control valve in one of said fluid circuits and having a diaphragm member and a stem movable in response to a change in a characteristic of the first fluid flowing from said heat exchanger means, and means responsive to the stem movement of said diaphragm control valve for varying the pressure of said other fluid on said other side of the diaphragm member of said diaphragm valve.

11. A control system of the character described comprising a group of heat exchangers effective to heat a liquid flowing therethrough by steam flowing therethrough, steam circuit means extending from a supply source to said heat exchangers, liquid circuit means for the liquid extending from a supply source to said heat exchangers and from said heat exchangers to a use location, sensing means in said liquid circuit means intermediate the heat exchangers and said use location for sensing a condition of said liquid and providing an output signal depending on the viscosity of said liquid, control devices operatively associated with said steam supply circuit controlling the flow of steam to said heat exchangers, control means operatively associated with said sensing means and said control devices and responsive to the output signal of said sensing means to actuate said control devices to effect a sequential increase or decrease in the flow of steam to said group of heat exchangers in a phased overlapping seriatim manner and providing in the system a variable heat transfer area for heating the liquid, said sensing means in said liquid circuit means including a blender receiving the flowing liquid from all said heat exchangers and a viscosity sensing probe in said blender and sensing the viscosity of the blended liquid, said control devices including a first set of diaphragm control valves controlling the flow of steam to said heat exchangers and responsive to changes in the sensed characteristics of the flowing liquid, air pressure supply circuit means to said diaphragm control valves, and of the first set of diaphragm control valves at least the diaphragm control valve for the first heat exchanger in the group of heat exchangers has operatively associated with it an electropneumatic positioner which regulates the amplitude of operation of said diaphragm control valve, while said control means that is operatively associated with said sensing means includes a computer receiving an electric signal from said sensing means, and a control instrument receiving an electric signal from said computer, and an electrical circuit from said control instrument to said electropneumatic positioner to impart an electric signal to said positioner to adjust the functional amplitude of said diaphragm control valve.

12. A control system of the character described comprising a group of heat exchangers effective to heat a liquid flowing therethrough by steam flowing therethrough, steam circuit means extending from a supply source to said heat exchangers, liquid circuit means for the liquid extending from a supply source to said heat exchangers and from said heat exchangers to a use location, sensing means in said liquid circuit means intermediate the heat exchangers and said use location for sensing a condition of said liquid and providing an output signal depending on the viscosity of said liquid control devices operatively associated with said steam supply circuit controlling the flow of steam to said heat exchangers, control means operatively associated with said sensing means and said control devices and responsive to the output signal of said sensing means to actuate said control devices to effect a sequential increase or decrease in the flow of steam to said group of heat exchangers in a phased overlapping seriatim manner and providing in the system a variable heat transfer area for heating the liquid, said sensing means in said liquid circuit means including a blender receiving the flowing liquid from all said heat exchangers and a viscosity sensing probe in said blender and sensing the viscosity of the blended liquid, said control devices including a first set of diaphragm control valves controlling the flow of steam to said heat exchangers and responsive to changes in the sensed characteristics of the flowing liquid, air pressure supply circuit means to said diaphragm control valves, and at least the one diaphragm control valve for the first heat exchanger in the group of heat exchangers has operatively associated with it an electropneumatic positioner which regulates the amplitude of operation of said one diaphragm control valve, and said control means that is operatively associated with said sensing means includes a computer receiving an electric signal from said sensing means, a control instrument receiving an electric signal from said computer and an electrical circuit from said control instrument to said electropneumatic positioner to impart an electric signal to said positioner to adjust the functional amplitude of said diaphragm control valve, said control devices further including a second set of diaphragm control valves operatively associated with the steam supply circuit means intermediate the diaphragm control valves of the first set and said heat exchangers, feedback steam conduit means extending from the steam supply circuit means to said diaphragm valves of the second set and intermediate the latter and said heat exchangers, and position transmitters operatively associated with the diaphragm control valves of the first set and said air pressure supply circuit means and having their outlets connected to the diaphragm valves of the second set.

References Cited by the Examiner

UNITED STATES PATENTS

| | | | |
|---|---|---|---|
| 2,105,882 | 1/38 | Fleisher | 165—101 |
| 2,265,599 | 12/41 | Griffey | 236—92 |
| 2,414,953 | 1/47 | Johnson | 165—101 |
| 3,025,232 | 3/62 | Jones | 137—92 X |

CHARLES SUKALO, *Primary Examiner.*

HARRY B. THORNTON, *Examiner.*